(12) United States Patent
Purigindla et al.

(10) Patent No.: US 11,777,808 B2
(45) Date of Patent: Oct. 3, 2023

(54) METHOD AND SYSTEM FOR PROVIDING AN END-TO-END ASSET HIERARCHY

(71) Applicant: JPMorgan Chase Bank, N.A., New York, NY (US)

(72) Inventors: Venkata Ramesh Purigindla, Hyderabad (IN); Anusaa Vemuri, Secunderabad (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/648,094

(22) Filed: Jan. 14, 2022

(65) Prior Publication Data

US 2022/0263719 A1    Aug. 18, 2022

Related U.S. Application Data

(60) Provisional application No. 63/155,062, filed on Mar. 1, 2021.

(30) Foreign Application Priority Data

Jan. 16, 2021  (IN) .............................. 202111002104

(51) Int. Cl.
*H04L 41/12* (2022.01)
*H04L 41/22* (2022.01)
*H04L 41/142* (2022.01)
*H04L 41/14* (2022.01)

(52) U.S. Cl.
CPC ............ *H04L 41/12* (2013.01); *H04L 41/142* (2013.01); *H04L 41/145* (2013.01); *H04L 41/22* (2013.01)

(58) Field of Classification Search
CPC ..... H04L 41/12; H04L 41/142; H04L 41/145; H04L 41/22; H04L 41/16
USPC ......................................................... 709/223
See application file for complete search history.

(56) References Cited

U.S. PATENT DOCUMENTS

2003/0084134 A1\* 5/2003 Pace ......................... H04L 9/40
709/223
2020/0265329 A1\* 8/2020 Thomsen ............. G05B 13/041

\* cited by examiner

*Primary Examiner* — David R Lazaro
*Assistant Examiner* — Zia Khurshid
(74) *Attorney, Agent, or Firm* — Greenblum & Bernstein, P.L.C.

(57) ABSTRACT

A method for providing an end-to-end asset hierarchy by using at least one model is disclosed. The method includes identifying asset data in a networked environment, the asset data including dependency data corresponding to an asset; compiling the identified asset data; mapping, by using a model, the asset with a corresponding dependent asset and a corresponding dependent service based on the asset data; generating an asset hierarchy based on a result of the mapping; and storing the generated asset hierarchy in a repository.

20 Claims, 8 Drawing Sheets

METHOD AND SYSTEM FOR PROVIDING AN END-TO-END ASSET HIERARCHY

CROSS-REFERENCE TO RELATED APPLICATIONS

This application claims the benefit of Indian Provisional Patent Application No. 202111002104, filed Jan. 16, 2021, which is hereby incorporated by reference in its entirety. This application also claims the benefit of U.S. Provisional Patent Application Ser. No. 63/155,062, filed Mar. 1, 2021, which is hereby incorporated by reference in its entirety.

BACKGROUND

1. Field of the Disclosure

This technology generally relates to methods and systems for providing an asset hierarchy, and more particularly to methods and systems for providing an end-to-end asset hierarchy that utilizes data models to connect application and infrastructure assets in a networked environment to facilitate the identification of corresponding dependencies.

2. Background Information

Many business entities operate vast enterprise networks of computing assets such as, for example, infrastructure assets and application assets to facilitate day-to-day business operations. To keep track of these numerous computing assets, the business entities often utilize large repositories to store asset information. Historically, the asset information is stored as a loose collection of nonconnected data files, which have resulted in varying degrees of success with respect to identifying infrastructure assets and detecting application dependencies in the networked environment.

One drawback of using conventional techniques to maintain asset information is that in many instances, an infrastructure and data expert must manually perform multiple searches for the nonconnected files in a large repository to identify asset interdependencies. For example, an owner of an outdated asset in the networked environment must rely on the proficiency and infrastructure knowledge of an expert to obtain end-to-end dependency data for the outdated asset before the owner may decommission the outdated asset. As a result, the process to manually obtain end-to-end dependency data is inefficient and success often depends on the proficiency and infrastructure knowledge of the expert. Additionally, in expansive enterprise networks, the manual searching of asset interdependencies may not be feasible.

Therefore, there is a need for an end-to-end asset hierarchy that utilizes data models to connect application and infrastructure assets in a networked environment to facilitate an efficient identification of dependencies.

SUMMARY

The present disclosure, through one or more of its various aspects, embodiments, and/or specific features or sub-components, provides, inter alia, various systems, servers, devices, methods, media, programs, and platforms for providing an end-to-end asset hierarchy that utilizes data models to connect application and infrastructure assets in a networked environment to facilitate the identification of corresponding dependencies.

According to an aspect of the present disclosure, a method for providing an end-to-end asset hierarchy by using at least one model is disclosed. The method is implemented by at least one processor. The method may include identifying asset data in at least one networked environment, the asset data may include dependency data corresponding to at least one asset; compiling the identified asset data; mapping, by using the at least one model, the at least one asset with at least one from among a corresponding dependent asset and a corresponding dependent service based on the asset data; generating at least one asset hierarchy based on a result of the mapping; and storing the generated at least one asset hierarchy in at least one repository.

In accordance with an exemplary embodiment, the method may further include receiving an indication that at least one new asset has been deployed in the at least one networked environment; compiling new asset data corresponding to the at least one new asset; mapping, by using the at least one model, the at least one new asset with at least one from among a corresponding new dependent asset and a corresponding new dependent service based on the new asset data; and updating, in the at least one repository, the generated at least one asset hierarchy with the mapping of the at least one new asset.

In accordance with an exemplary embodiment, the method may further include receiving, via a graphical user interface, at least one request, the at least one request may relate to an end-to-end dependency data inquiry corresponding to at least one different asset; identifying, in the at least one repository, information relating to the at least one different asset in the at least one asset hierarchy; and displaying, via the graphical user interface, the identified information in response to the at least one request.

In accordance with an exemplary embodiment, to compile the identified asset data, the method may further include parsing the identified asset data to detect at least one component file; and automatically associating each of the at least one component file with an identifier tag that corresponds to the at least one asset.

In accordance with an exemplary embodiment, the method may further include identifying, by using the at least one model, at least one terminal asset that is projected to be decommissioned based on a time parameter and the asset data; and updating the at least one asset hierarchy with the identified at least one terminal asset.

In accordance with an exemplary embodiment, the at least one asset may include at least one from among a network infrastructure asset, a monolithic application asset, and a microservice application asset.

In accordance with an exemplary embodiment, the at least one model may correspond to at least one from among a debris analysis model, a compatibility investigation model, an application dependencies model, a multitenancy model, and an infrastructure dependencies model.

In accordance with an exemplary embodiment, the at least one model may include at least one from among a machine learning model, a mathematical model, a process model, and a data model.

In accordance with an exemplary embodiment, the at least one asset hierarchy may include a graphical representation of at least one connection between a plurality of assets in the networked environment to enable visualization of at least one relationship between each of the plurality of assets.

According to an aspect of the present disclosure, a computing device configured to implement an execution of a method for providing an end-to-end asset hierarchy by using at least one model is disclosed. The computing device including a processor; a memory; and a communication interface coupled to each of the processor and the memory, wherein the processor may be configured to identify asset data in at least one networked environment, the asset data may include dependency data corresponding to at least one asset; compile the identified asset data; map, by using the at least one model, the at least one asset with at least one from among a corresponding dependent asset and a corresponding dependent service based on the asset data; generate at least one asset hierarchy based on a result of the mapping; and store the generated at least one asset hierarchy in at least one repository.

In accordance with an exemplary embodiment, the processor may be further configured to receive an indication that at least one new asset has been deployed in the at least one networked environment; compile new asset data corresponding to the at least one new asset; map, by using the at least one model, the at least one new asset with at least one from among a corresponding new dependent asset and a corresponding new dependent service based on the new asset data; and update, in the at least one repository, the generated at least one asset hierarchy with the mapping of the at least one new asset.

In accordance with an exemplary embodiment, the processor may be further configured to receive, via a graphical user interface, at least one request, the at least one request may relate to an end-to-end dependency data inquiry corresponding to at least one different asset; identify, in the at least one repository, information relating to the at least one different asset in the at least one asset hierarchy; and display, via the graphical user interface, the identified information in response to the at least one request.

In accordance with an exemplary embodiment, to compile the identified asset data, the processor may be further configured to parse the identified asset data to detect at least one component file; and automatically associate each of the at least one component file with an identifier tag that corresponds to the at least one asset.

In accordance with an exemplary embodiment, the processor may be further configured to identify, by using the at least one model, at least one terminal asset that is projected to be decommissioned based on a time parameter and the asset data; and update the at least one asset hierarchy with the identified at least one terminal asset.

In accordance with an exemplary embodiment, the at least one asset may include at least one from among a network infrastructure asset, a monolithic application asset, and a microservice application asset.

In accordance with an exemplary embodiment, the at least one model may correspond to at least one from among a debris analysis model, a compatibility investigation model, an application dependencies model, a multitenancy model, and an infrastructure dependencies model.

In accordance with an exemplary embodiment, the at least one model may include at least one from among a machine learning model, a mathematical model, a process model, and a data model.

In accordance with an exemplary embodiment, the at least one asset hierarchy may include a graphical representation of at least one connection between a plurality of assets in the networked environment to enable visualization of at least one relationship between each of the plurality of assets.

According to an aspect of the present disclosure, a non-transitory computer readable storage medium storing instructions for providing an end-to-end asset hierarchy by using at least one model is disclosed. The storage medium including executable code which, when executed by a processor, may cause the processor to identify asset data in at least one networked environment, the asset data may include dependency data corresponding to at least one asset; compile the identified asset data; map, by using the at least one model, the at least one asset with at least one from among a corresponding dependent asset and a corresponding dependent service based on the asset data; generate at least one asset hierarchy based on a result of the mapping; and store the generated at least one asset hierarchy in at least one repository.

In accordance with an exemplary embodiment, the at least one asset hierarchy may include a graphical representation of at least one connection between a plurality of assets in the networked environment to enable visualization of at least one relationship between each of the plurality of assets.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
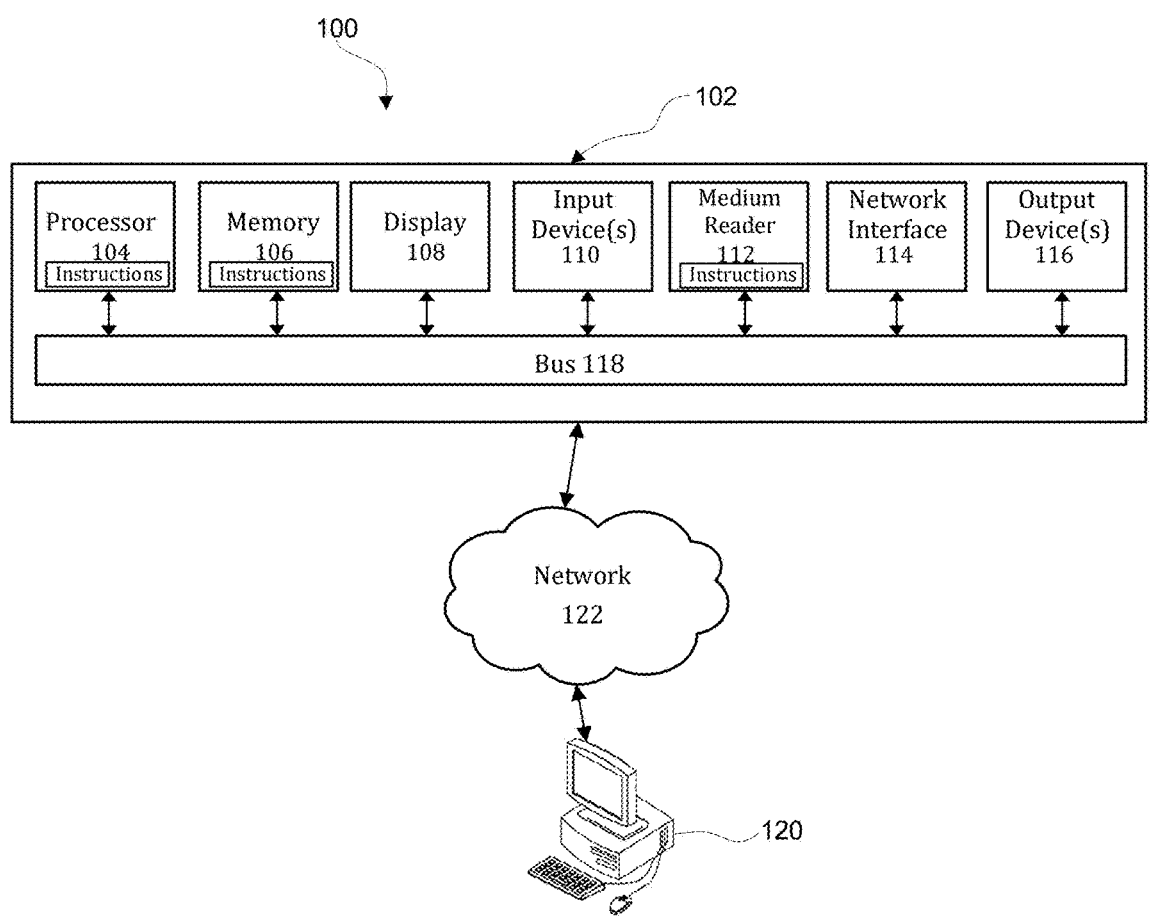
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an end-to-end asset hierarchy that utilizes data models to connect application and infrastructure assets in a networked environment to facilitate the identification of corresponding dependencies.

Figure 2:
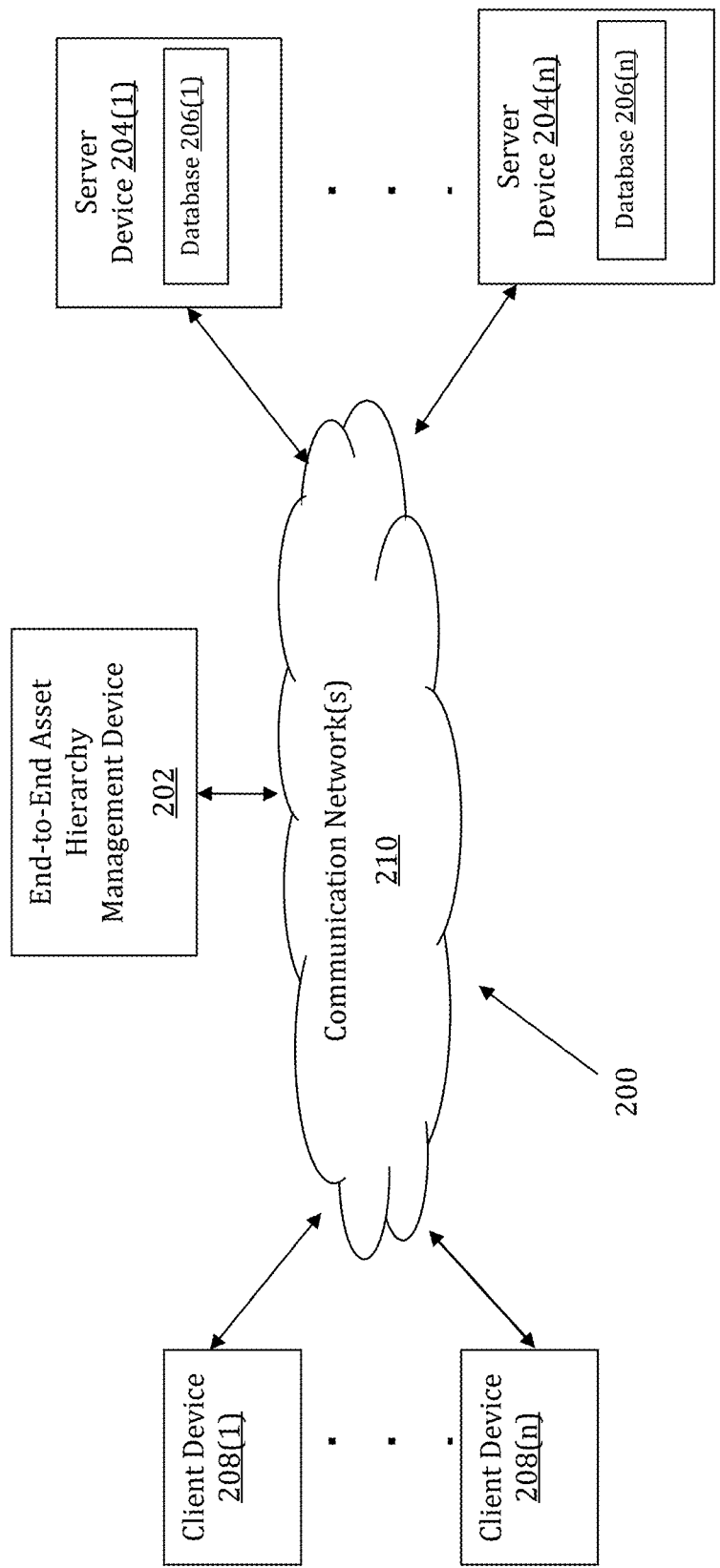
FIG. 2 illustrates an exemplary diagram of a network environment.

Referring to FIG. 2, a schematic of an exemplary network environment 200 for implementing a method for providing an end-to-end asset hierarchy that utilizes data models to connect application and infrastructure assets in a networked environment to facilitate the identification of corresponding dependencies is illustrated. In an exemplary embodiment, the method is executable on any networked computer platform, such as, for example, a personal computer (PC).

The method for providing an end-to-end asset hierarchy that utilizes data models to connect application and infrastructure assets in a networked environment to facilitate the identification of corresponding dependencies may be implemented by an End-to-End Asset Hierarchy Management (EAHM) device 202. The EAHM device 202 may be the same or similar to the computer system 102 as described with respect to FIG. 1. The EAHM device 202 may store one or more applications that can include executable instructions that, when executed by the EAHM device 202, cause the EAHM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the EAHM device 202 itself, may be located in virtual server(s) running in a cloud-based computing environment rather than being tied to one or more specific physical network computing devices. Also, the application(s) may be running in one or more virtual machines (VMs) executing on the EAHM device 202. Additionally, in one or more embodiments of this technology, virtual machine(s) running on the EAHM device 202 may be managed or supervised by a hypervisor.

In the network environment 200 of FIG. 2, the EAHM device 202 is coupled to a plurality of server devices 204(1)-204(n) that hosts a plurality of databases 206(1)-206(n), and also to a plurality of client devices 208(1)-208(n) via communication network(s) 210. A communication interface of the EAHM device 202, such as the network interface 114 of the computer system 102 of FIG. 1, operatively couples and communicates between the EAHM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the EAHM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and EAHM devices that efficiently implement a method for providing an end-to-end asset hierarchy that utilizes data models to connect application and infrastructure assets in a networked environment to facilitate the identification of corresponding dependencies.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The EAHM device 202 may be a standalone device or integrated with one or more other devices or apparatuses, such as one or more of the server devices 204(1)-204(n), for example. In one particular example, the EAHM device 202 may include or be hosted by one of the server devices 204(1)-204(n), and other arrangements are also possible. Moreover, one or more of the devices of the EAHM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the EAHM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to asset data, infrastructure data, application data, dependency data, mapping data, and asset hierarchies.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the EAHM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the EAHM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the EAHM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the EAHM device 202, the server devices 204(1)-204(n), or the client devices 208(1)-208(n), for example, may be configured to operate as virtual instances on the same physical machine. In other words, one or more of the EAHM device 202, the server devices 204(1)-204(n), or the client devices 208(1)-208(n) may operate on the same physical device rather than as separate devices communicating through communication network(s) 210. Additionally, there may be more or fewer EAHM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
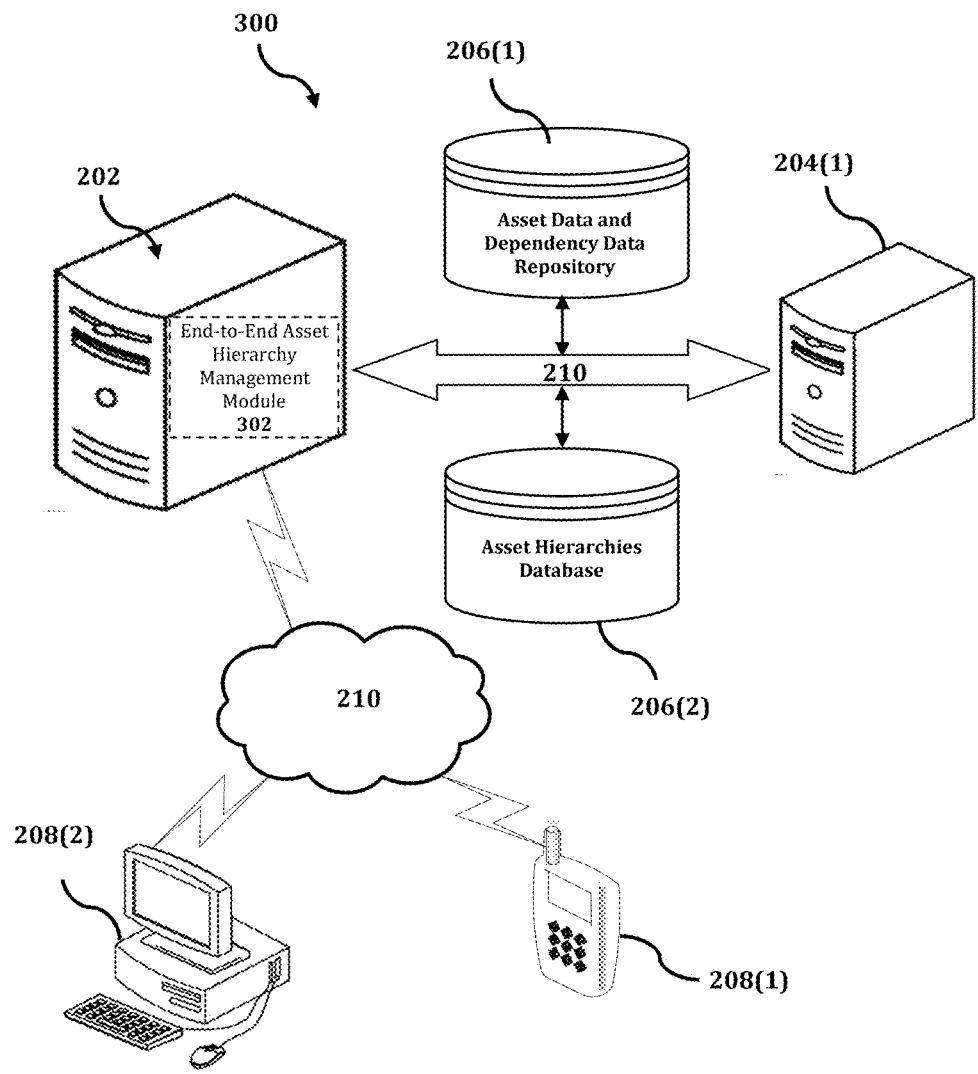
FIG. 3 shows an exemplary system for implementing a method for providing an end-to-end asset hierarchy that utilizes data models to connect application and infrastructure assets in a networked environment to facilitate the identification of corresponding dependencies.

The EAHM device 202 is described and shown in FIG. 3 as including an end-to-end asset hierarchy management module 302, although it may include other rules, policies, modules, databases, or applications, for example. As will be described below, the end-to-end asset hierarchy management module 302 is configured to implement a method for providing an end-to-end asset hierarchy that utilizes data models to connect application and infrastructure assets in a networked environment to facilitate the identification of corresponding dependencies.

An exemplary process 300 for implementing a mechanism for providing an end-to-end asset hierarchy that utilizes data models to connect application and infrastructure assets in a networked environment to facilitate the identification of corresponding dependencies by utilizing the network environment of FIG. 2 is shown as being executed in FIG. 3. Specifically, a first client device 208(1) and a second client device 208(2) are illustrated as being in communication with EAHM device 202. In this regard, the first client device 208(1) and the second client device 208(2) may be "clients" of the EAHM device 202 and are described herein as such. Nevertheless, it is to be known and understood that the first client device 208(1) and/or the second client device 208(2) need not necessarily be "clients" of the EAHM device 202, or any entity described in association therewith herein. Any additional or alternative relationship may exist between either or both of the first client device 208(1) and the second client device 208(2) and the EAHM device 202, or no relationship may exist.

Further, EAHM device 202 is illustrated as being able to access an asset data and dependency data repository 206(1) and an asset hierarchy database 206(2). The end-to-end asset hierarchy management module 302 may be configured to access these databases for implementing a method for providing an end-to-end asset hierarchy that utilizes data models to connect application and infrastructure assets in a networked environment to facilitate the identification of corresponding dependencies.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the EAHM device 202 via broadband or cellular communication. Of course, these embodiments are merely exemplary and are not limiting or exhaustive.

Upon being started, the end-to-end asset hierarchy management module 302 executes a process for providing an end-to-end asset hierarchy that utilizes data models to connect application and infrastructure assets in a networked environment to facilitate the identification of corresponding dependencies. An exemplary process for providing an end-to-end asset hierarchy that utilizes data models to connect application and infrastructure assets in a networked environment to facilitate the identification of corresponding dependencies is generally indicated at flowchart 400 in FIG. 4.

Figure 4:
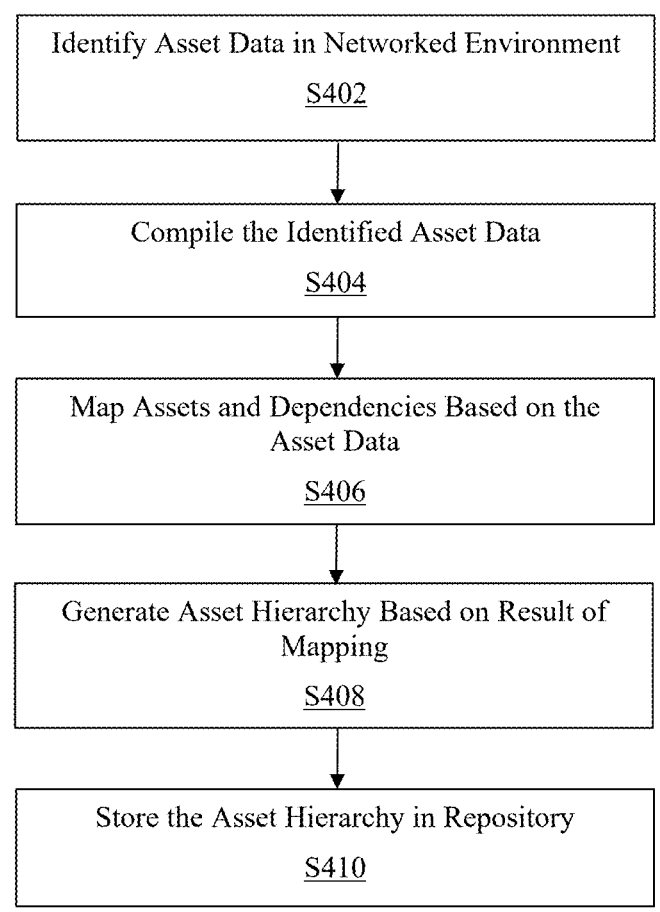
FIG. 4 is a flowchart of an exemplary process for implementing a method for providing an end-to-end asset hierarchy that utilizes data models to connect application and infrastructure assets in a networked environment to facilitate the identification of corresponding dependencies.

In the process 400 of FIG. 4, at step S402, asset data may be identified in a networked environment. The asset data may include dependency data corresponding to an asset. In an exemplary embodiment, the asset may include at least one from among a network infrastructure asset, a monolithic application asset, and a microservice application asset. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing. In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography performs corresponding actions independently and does not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the identified asset data may be compiled and stored in a repository. In an exemplary embodiment, the identified asset data may be parsed into component files and automatically associated with an identifier tag. For example, a data file may be broken down into component parts which may then be identified via an identifier tag. In another exemplary embodiment, the component files may be filtered based on predetermined criteria prior to storage in the repository to reduce storage requirements.

At step S406, by using a model, the asset may be mapped with at least one from among a corresponding dependent asset and a corresponding dependent service based on the asset data. The asset may be associated with corresponding dependencies that are identified from the asset data. In an exemplary embodiment, the model may correspond to at least one from among a debris analysis model, a compatibility investigation model, an application dependencies model, a multitenancy model, and an infrastructure dependencies model.

In another exemplary embodiment, the debris analysis model may include a specifically targeted model such as, for example, a decommission model that would assist in the analysis of decommissioned assets. The debris analysis model may enable understanding of stale application charges associated with previously decommissioned applications. In another exemplary embodiment, the debris analysis model may identify the stale application charges to enable the efficient execution of clean up processes. For example, when an application has been decommissioned, the debris analysis model may identify orphaned dependencies enabling the efficient removal of these dependencies. Efficient removal of these dependencies free up valuable network resources for reallocation.

In another exemplary embodiment, the compatibility investigation model may include a specifically targeted model such as, for example, an infrastructure manager model that would assist in identifying platform versions and end-of-life aspects of all the assets in a group. The compatibility investigation model may enable understanding of infrastructure components and associated dependencies to identify potential cost saving opportunities from increasing infrastructure efficiency. In another exemplary embodiment, the compatibility investigation model may provide asset and dependency data for a particular infrastructure group to facilitate the planning of technology refreshes. For example, the compatibility investigation model may provide asset versions and dependency data to ensure that a new asset may be implemented in an existing infrastructure group without compatibility concerns.

In another exemplary embodiment, the application dependencies model and the multitenancy model may include specifically targeted models such as, for example, an application owner model that would assist in identifying application dependencies. The application owner model may enable the understanding of application dependencies in situations where a single instance of an application serves multiple tenants. As will be appreciated by a person of ordinary skill in the art, the application owner model may apply to applications in single-tenant architectures as well as applications in multi-tenant architectures.

In another exemplary embodiment, the infrastructure dependencies model may include specifically targeted models such as, for example, a data center operations model that would assist in investigating infrastructure dependencies and provide a rack level view of assets. The infrastructure dependencies model may enable the understanding of assets in an infrastructure group on a rack level. For example, the infrastructure dependencies model may provide infrastructure dependency information for a particular server rack at a specific geographical location. The infrastructure dependency information may correspond to assets and dependencies hosted at the particular server rack. In another exemplary embodiment, the infrastructure dependencies model may enable the optimization of server rack utilization by facilitating the visual identification of underutilized server racks. The identification of underutilized server racks may enable the scaling of usage based on need.

In another exemplary embodiment, the model may include at least one from among a data model, a mathematical model, a process model, and a machine learning model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that the training model's least squares error rate, true positive rate, true negative rate, false positive rate, and false negative rates are within predetermined ranges. In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S408, an asset hierarchy may be generated based on a result of the mapping. In an exemplary embodiment, an asset hierarchy may include data representations as well as graphical representations of the machines, equipment, and individual components owned by a company in one or more locations. The asset hierarchy may graphically represent connections between various assets in a networked environment to enable the visualization of relationships between the various assets.

In another exemplary embodiment, the relationships between the various assets may be represented as a diagram with shape elements embodying assets and connector elements embodying relationships between the assets. As will be appreciated by a person of ordinary skill in the art, the asset hierarchy may include data-based representation of the assets and dependencies as well as graphical representations such as, for example, as component diagrams that are displayed via a graphical user interface.

At step S410, the generated asset hierarchy may be stored in the repository. In an exemplary embodiment, the asset hierarchy may be retrieved upon request from a graphical user interface in a variety of use cases. The asset hierarchy may enable strategic decision making based on utilization factor of an asset. The asset hierarchy may provide an end-to-end asset mapping and provide transparency to application owners. The asset hierarchy may provide visual representation of projected and forecasted assets to be decommissioned based on time dimensions. The asset hierarchy may facilitate error detection in an infrastructure group by visualizing unassociated assets and dependencies.

In another exemplary embodiment, an indication that a new asset has been deployed in the networked environment may be received. New asset data corresponding to the new asset may then be compiled. By using the model, the new asset may be mapped with at least one from among a corresponding new dependent asset and a corresponding new dependent service based on the new asset data. Then, the asset hierarchy that is stored in the repository may be updated with the mapping of the new asset.

In another exemplary embodiment, a request may be received via a graphical user interface. The request may relate to an end-to-end dependency data inquiry corresponding to a different asset. Then, information relating to the different asset may be identified in the asset hierarchy that is stored in the repository. The identified information may subsequently be displayed via the graphical user interface in response to the request.

Figure 5:
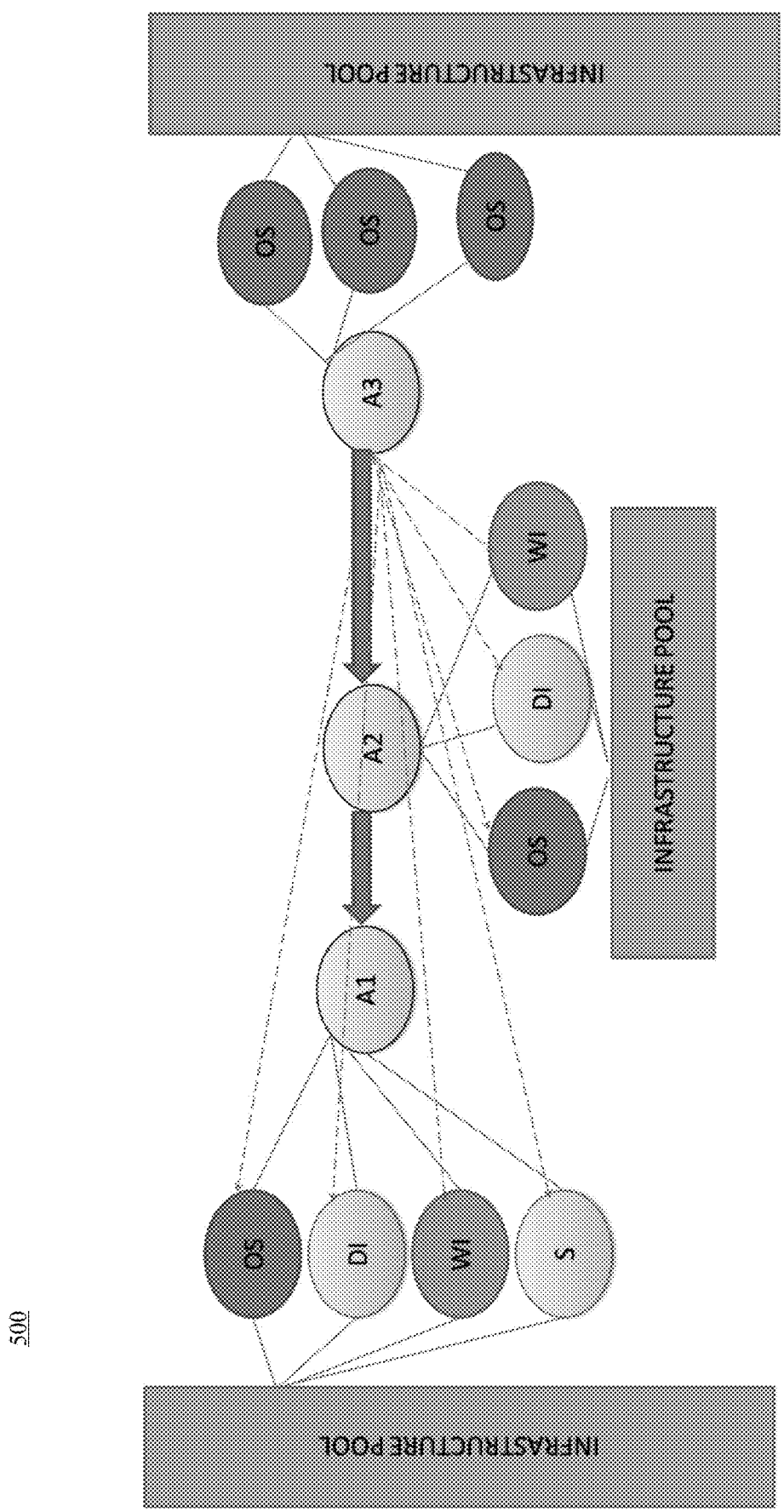
FIG. 5 is an application network diagram of an exemplary process for implementing a method for providing an end-to-end asset hierarchy that utilizes data models to connect application and infrastructure assets in a networked environment to facilitate the identification of corresponding dependencies.

FIG. 5 is an application network diagram 500 of an exemplary process for implementing a method for providing an end-to-end asset hierarchy that utilizes data models to connect application and infrastructure assets in a networked environment to facilitate the identification of corresponding dependencies. Application network diagram 500 discloses application dependencies in which an application named "A3" communicated with an application named "A2" which in turn communicates with an application named "A1."

As illustrated in FIG. 5, application A1 is initially connected to an infrastructure pool via an operating system (OS), a database instance (DI), and a web instance (WI). Application A2 is initially connected to a different infrastructure pool via a different OS, DI, and WI. Application A3 is initially connected to another infrastructure pool via another OS. However, once A1 is in communication with A2 and A3, dependencies between the various OS, DI, and WI are formed and illustrated in FIG. 5 as dashed lines. Application network diagram 500 explains the need to establish the asset model to enable the understanding of connected systems for critical applications. Without such a model, the dependencies of each of applications A1, A2, and A3, may not be effectively identified.

Figure 6:
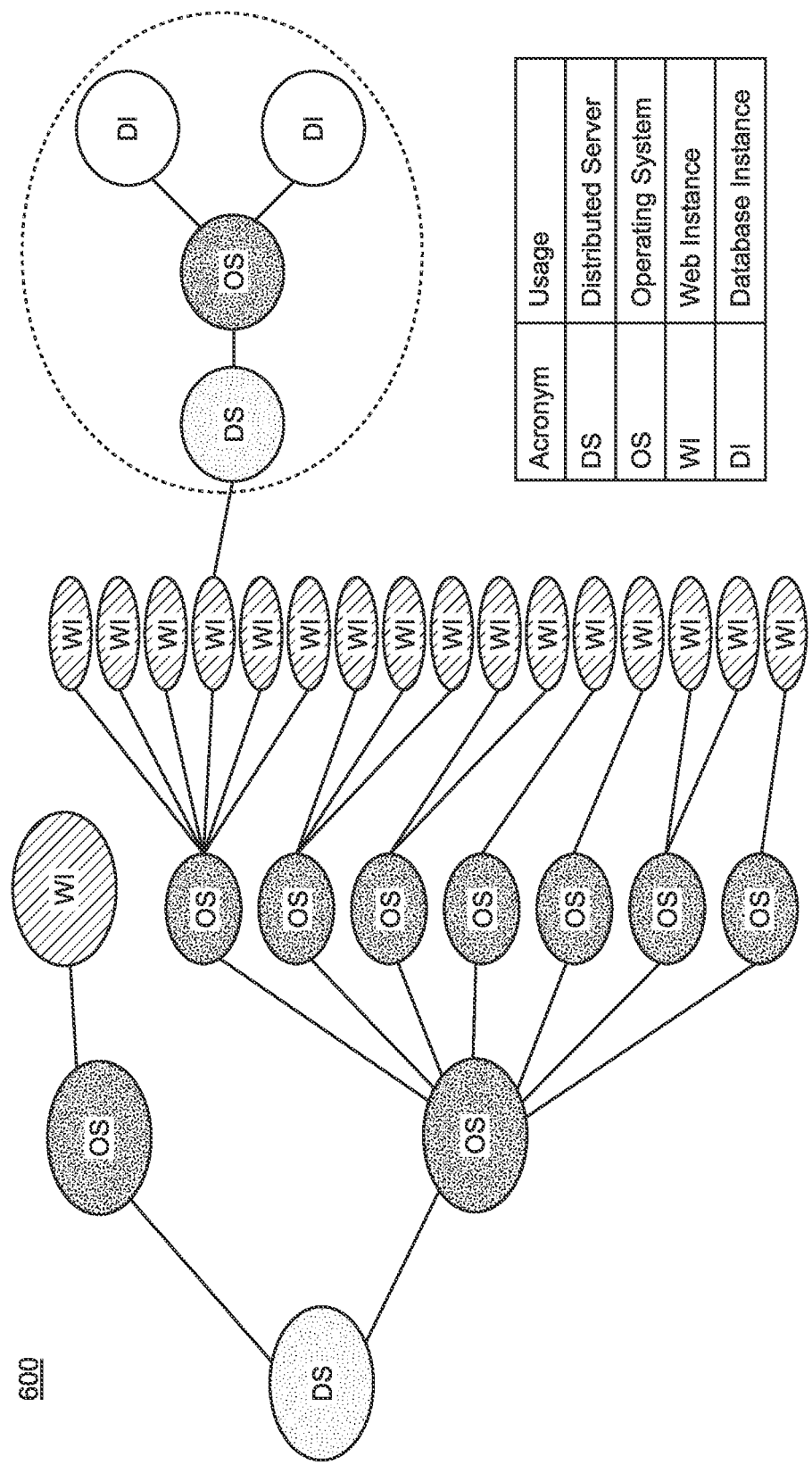
FIG. 6 is a network diagram of an asset hierarchy relating to an exemplary process for implementing a method for providing an end-to-end asset hierarchy that utilizes data models to connect application and infrastructure assets in a networked environment to facilitate the identification of corresponding dependencies.

FIG. 6 is a network diagram 600 of an asset hierarchy relating to an exemplary process for implementing a method for providing an end-to-end asset hierarchy that utilizes data models to connect application and infrastructure assets in a networked environment to facilitate the identification of corresponding dependencies. As illustrated in FIG. 6, dependencies associated with a specific parent asset such as, for example, a distributed server may be visually identified. The dependencies may include various distributed servers (DS), operating systems (OS), web instances (WI), and database instances (DI). Additionally, within a particular WI, additional dependencies between a different DS, a different OS, and a different DI may also be graphically represented.

Figure 7:
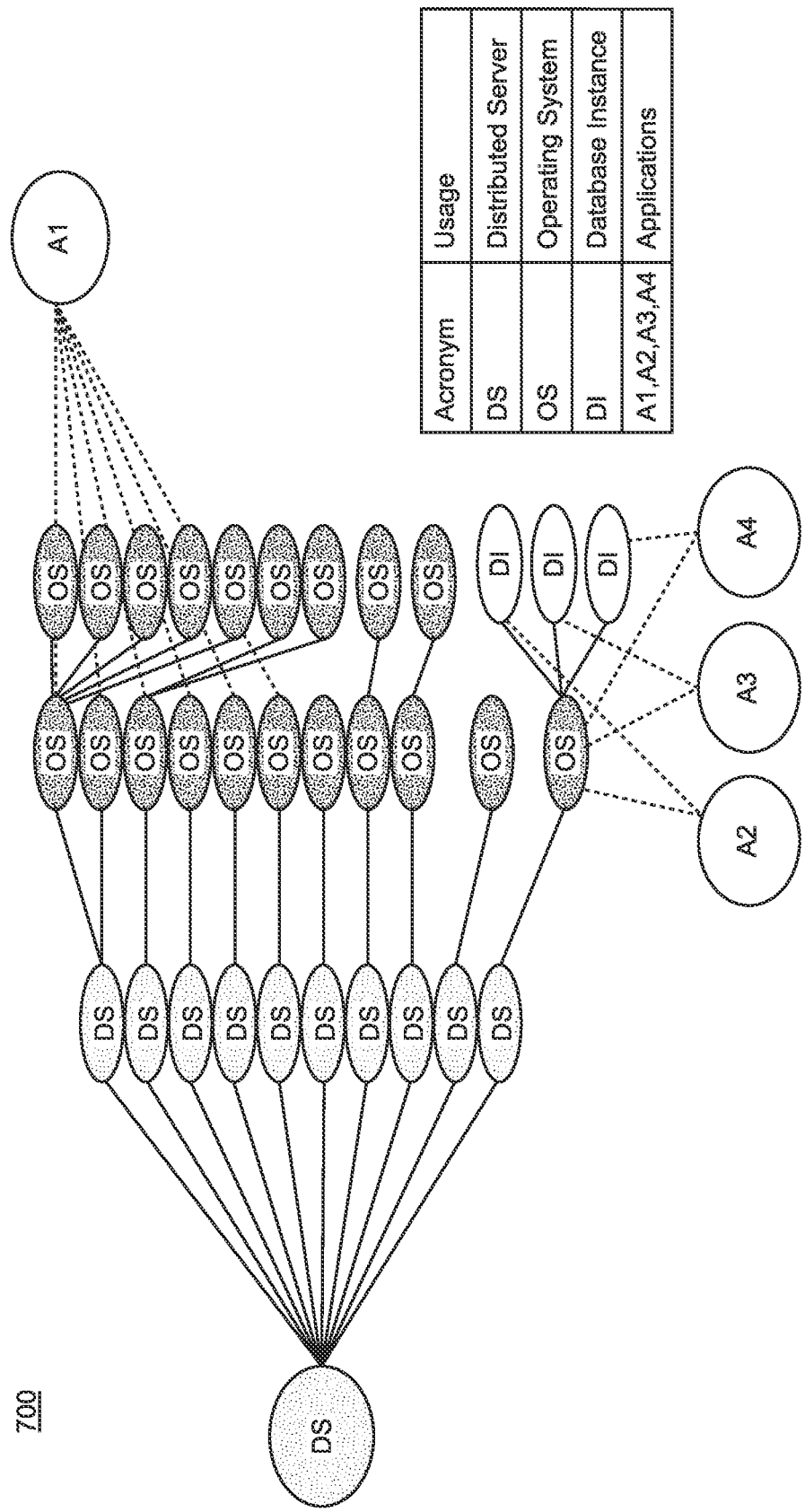
FIG. 7 is a network diagram of an asset hierarchy with multitenancy relating to an exemplary process for implementing a method for providing an end-to-end asset hierarchy that utilizes data models to connect application and infrastructure assets in a networked environment to facilitate the identification of corresponding dependencies.

FIG. 7 is a network diagram 700 of an asset hierarchy with multitenancy relating to an exemplary process for implementing a method for providing an end-to-end asset hierarchy that utilizes data models to connect application and infrastructure assets in a networked environment to facilitate the identification of corresponding dependencies. As illustrated in FIG. 7, in a multitenancy asset hierarchy, assets without dashed line linkages may be identified and called out for a lack of an identifier tag. The unidentified assets may represent an error condition or a leftover dependency. Visualizing these discrepancies may enable a network administrator to effectively focus attention to these discrepancies.

Figure 8:
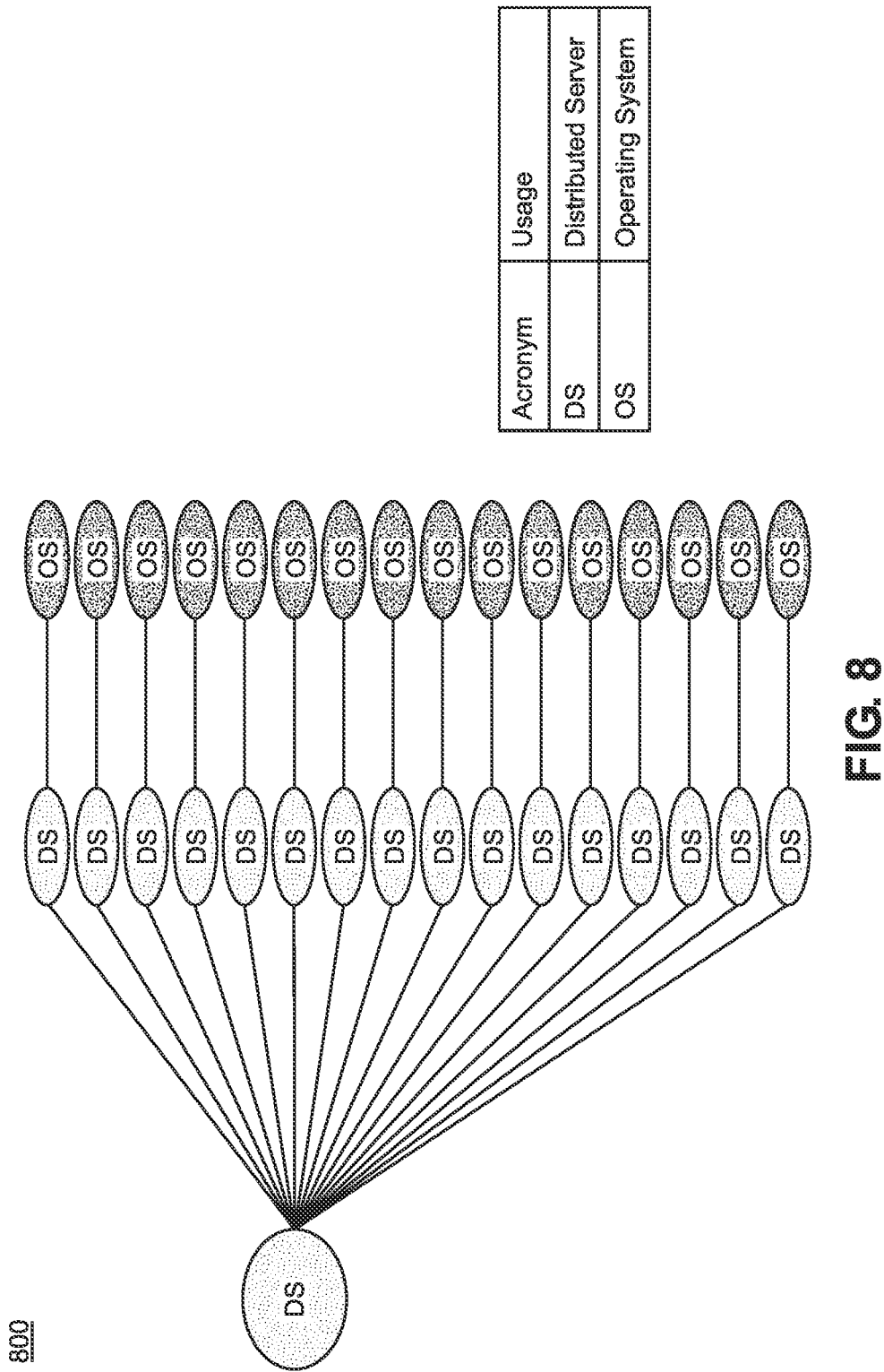
FIG. 8 is a network diagram of an infrastructure specific asset hierarchy relating to an exemplary process for implementing a method for providing an end-to-end asset hierarchy that utilizes data models to connect application and infrastructure assets in a networked environment to facilitate the identification of corresponding dependencies.

FIG. 8 is a network diagram 800 of an infrastructure specific asset hierarchy relating to an exemplary process for implementing a method for providing an end-to-end asset hierarchy that utilizes data models to connect application and infrastructure assets in a networked environment to facilitate the identification of corresponding dependencies. As illustrated in FIG. 8, dependencies associated with a parent distributed server (DS) in a particular server rack may be visually presented. In another exemplary embodiment, the visualization of this particular server rack may enable an administrator to optimize usage based on the identified dependencies. Similarly, the administrator may scale usage for this particular server rack as necessary based on the identified dependencies.

Accordingly, with this technology, an optimized process for providing an end-to-end asset hierarchy that utilizes data models to connect application and infrastructure assets in a networked environment to facilitate the identification of corresponding dependencies is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an end-to-end asset hierarchy by using at least one model, the method being implemented by at least one processor, the method comprising:
   identifying, by the at least one processor, asset data in at least one networked environment, the asset data including dependency data corresponding to at least one asset;
   compiling, by the at least one processor, the identified asset data;
   mapping, by the at least one processor using the at least one model, the at least one asset with at least one from among a corresponding dependent asset and a corresponding dependent service based on the asset data;
   generating, by the at least one processor, at least one asset hierarchy based on a result of the mapping by,
      detecting, by the at least one processor, at least one error in an infrastructure group by visualizing unassociated assets and unassociated dependencies,
      wherein the unassociated assets and the unassociated dependencies represent a leftover dependency; and
      wherein the at least one asset hierarchy includes the at least one error; and
   storing, by the at least one processor, the generated at least one asset hierarchy in at least one repository.

2. The method of claim 1, further comprising:
   receiving, by the at least one processor, an indication that at least one new asset has been deployed in the at least one networked environment;
   compiling, by the at least one processor, new asset data corresponding to the at least one new asset;
   mapping, by the at least one processor using the at least one model, the at least one new asset with at least one from among a corresponding new dependent asset and a corresponding new dependent service based on the new asset data; and
   updating, by the at least one processor in the at least one repository, the generated at least one asset hierarchy with the mapping of the at least one new asset.

3. The method of claim 1, further comprising:
   receiving, by the at least one processor via a graphical user interface, at least one request, the at least one request relating to an end-to-end dependency data inquiry corresponding to at least one different asset;
   identifying, by the at least one processor in the at least one repository, information relating to the at least one different asset in the at least one asset hierarchy; and
   displaying, by the at least one processor via the graphical user interface, the identified information in response to the at least one request.

4. The method of claim 1, wherein compiling the identified asset data further comprises:
   parsing, by the at least one processor, the identified asset data to detect at least one component file; and
   automatically associating, by the at least one processor, each of the at least one component file with an identifier tag that corresponds to the at least one asset.

5. The method of claim 1, further comprising:
   identifying, by the at least one processor using the at least one model, at least one terminal asset that is projected to be decommissioned based on a time parameter and the asset data; and updating, by the at least one processor, the at least one asset hierarchy with the identified at least one terminal asset.

6. The method of claim 1, wherein the at least one asset includes at least one from among a network infrastructure asset, a monolithic application asset, and a microservice application asset.

7. The method of claim 1, wherein the at least one model corresponds to at least one from among a debris analysis model, a compatibility investigation model, an application dependencies model, a multitenancy model, and an infrastructure dependencies model.

8. The method of claim 1, wherein the at least one model includes at least one from among a machine learning model, a mathematical model, a process model, and a data model.

9. The method of claim 1, wherein the at least one asset hierarchy includes a graphical representation of at least one connection between a plurality of assets in the networked environment to enable visualization of at least one relationship between each of the plurality of assets.

10. A computing device configured to implement an execution of a method for providing an end-to-end asset hierarchy by using at least one model, the computing device comprising:
a processor;
a memory; and
a communication interface coupled to each of the processor and the memory,
wherein the processor is configured to:
identify asset data in at least one networked environment, the asset data including dependency data corresponding to at least one asset;
compile the identified asset data;
map, by using the at least one model, the at least one asset with at least one from among a corresponding dependent asset and a corresponding dependent service based on the asset data;
generate at least one asset hierarchy based on a result of the mapping by causing the processor to,
detect at least one error in an infrastructure group by visualizing unassociated assets and unassociated dependencies,
wherein the unassociated assets and the unassociated dependencies represent a leftover dependency; and
wherein the at least one asset hierarchy includes the at least one error; and
store the generated at least one asset hierarchy in at least one repository.

11. The computing device of claim 10, wherein the processor is further configured to:
receive an indication that at least one new asset has been deployed in the at least one networked environment;
compile new asset data corresponding to the at least one new asset;
map, by using the at least one model, the at least one new asset with at least one from among a corresponding new dependent asset and a corresponding new dependent service based on the new asset data; and
update, in the at least one repository, the generated at least one asset hierarchy with the mapping of the at least one new asset.

12. The computing device of claim 10, wherein the processor is further configured to:
receive, via a graphical user interface, at least one request, the at least one request relating to an end-to-end dependency data inquiry corresponding to at least one different asset;
identify, in the at least one repository, information relating to the at least one different asset in the at least one asset hierarchy; and
display, via the graphical user interface, the identified information in response to the at least one request.

13. The computing device of claim 10, wherein, to compile the identified asset data, the processor is further configured to:
parse the identified asset data to detect at least one component file; and
automatically associate each of the at least one component file with an identifier tag that corresponds to the at least one asset.

14. The computing device of claim 10, wherein the processor is further configured to:
identify, by using the at least one model, at least one terminal asset that is projected to be decommissioned based on a time parameter and the asset data; and
update the at least one asset hierarchy with the identified at least one terminal asset.

15. The computing device of claim 10, wherein the at least one asset includes at least one from among a network infrastructure asset, a monolithic application asset, and a microservice application asset.

16. The computing device of claim 10, wherein the at least one model corresponds to at least one from among a debris analysis model, a compatibility investigation model, an application dependencies model, a multitenancy model, and an infrastructure dependencies model.

17. The computing device of claim 10, wherein the at least one model includes at least one from among a machine learning model, a mathematical model, a process model, and a data model.

18. The computing device of claim 10, wherein the at least one asset hierarchy includes a graphical representation of at least one connection between a plurality of assets in the networked environment to enable visualization of at least one relationship between each of the plurality of assets.

19. A non-transitory computer readable storage medium storing instructions for providing an end-to-end asset hierarchy by using at least one model, the storage medium comprising executable code which, when executed by a processor, causes the processor to:
identify asset data in at least one networked environment, the asset data including dependency data corresponding to at least one asset;
compile the identified asset data;
map, by using the at least one model, the at least one asset with at least one from among a corresponding dependent asset and a corresponding dependent service based on the asset data;
generate at least one asset hierarchy based on a result of the mapping by causing the processor to,
detect at least one error in an infrastructure group by visualizing unassociated assets and unassociated dependencies,
wherein the unassociated assets and the unassociated dependencies represent a leftover dependency; and
wherein the at least one asset hierarchy includes the at least one error; and
store the generated at least one asset hierarchy in at least one repository.

20. The storage medium of claim 19, wherein the at least one asset hierarchy includes a graphical representation of at least one connection between a plurality of assets in the networked environment to enable visualization of at least one relationship between each of the plurality of assets.

\* \* \* \* \*